US00RE34572E

United States Patent [19]

Johnson et al.

[11] E Patent Number: Re. 34,572

[45] Reissued Date of Patent: Mar. 29, 1994

[54] EXERCISE MACHINE WITH MULTIPLE EXERCISE STATIONS

[75] Inventors: Jeffrey B. Johnson; Arthur B. Ish, III, both of Redmond, Wash.

[73] Assignee: Vectra Fitness, Inc., Redmond, Wash.

[21] Appl. No.: 697,949

[22] Filed: May 9, 1991

Related U.S. Patent Documents

Reissue of:

[64] Patent No.: 4,809,972
Issued: Mar. 7, 1989
Appl. No.: 97,549
Filed: Sep. 16, 1987

[51] Int. Cl.[5] ..... A63B 21/06

[52] U.S. Cl. ..... 482/99; 482/100; 482/138

[58] Field of Search ..... 272/93, 117, 118, 123, 272/130, 134, 136, 142, 144; 482/93, 94, 97, 98, 99, 100, 101, 102, 103, 104, 106, 133, 134, 135, 136, 137, 138, 142

[56] References Cited

U.S. PATENT DOCUMENTS

| | | | |
|---|---|---|---|
| 723,625 | 3/1903 | Thornley | 272/118 |
| 931,699 | 8/1909 | Medart | 272/118 |
| 2,648,540 | 8/1953 | Hunter | 272/118 |
| 2,977,120 | 3/1961 | Morris | 272/118 |
| 3,640,528 | 2/1972 | Proctor | 272/118 |
| 3,815,903 | 6/1974 | Blomquist | 272/118 |
| 4,199,139 | 4/1980 | Mahnke et al. | 272/118 |
| 4,372,553 | 2/1983 | Hatfield | 272/134 X |
| 4,390,179 | 6/1983 | Szkalak | 272/118 |
| 4,456,245 | 6/1984 | Baldwin | 272/134 X |
| 4,505,475 | 3/1985 | Olschansky et al. | 272/118 |
| 4,509,746 | 4/1985 | Mask | 272/117 X |
| 4,634,127 | 1/1987 | Rockwell | 272/134 |
| 4,643,420 | 2/1987 | Riley et al. | 272/136 X |
| 4,697,809 | 10/1987 | Rockwell | 272/118 |
| 4,744,559 | 5/1988 | Mahnke et al. | 272/118 |

FOREIGN PATENT DOCUMENTS

| | | | |
|---|---|---|---|
| 3326426 | 1/1985 | Fed. Rep. of Germany | 272/118 |
| 7609655 | 3/1978 | Netherlands | 272/117 |
| 2158362 | 11/1985 | United Kingdom | 272/118 |

*Primary Examiner*—Robert Bahr
*Attorney, Agent, or Firm*—Seed and Berry

[57] ABSTRACT

An exercise machine has multiple stations at each of which two or more exercises are performed in opposition to a selected amount of weight in a weight stack. A cable and pulley system connects the exercise apparatus at the exercise stations with the weight stack in such a manner that only one pull cable in the system is connected to the weight stack.

22 Claims, 4 Drawing Sheets

EXERCISE MACHINE WITH MULTIPLE EXERCISE STATIONS

Matter enclosed in heavy brackets [ ] appears in the original patent but forms no part of this reissue specification; matter printed in italics indicates the additions made by reissue.

TECHNICAL FIELD

The present invention relates to exercise machines of the type having multiple exercise units which operate in opposition to a single set of weights.

BACKGROUND ART

A variety of exercise units have been used in exercise centers for many years each having a set of weights lifted responsive to manual force exerted for muscular development. The exerciser can normally vary the amount of weight resisting the exercising effort. As the need for compact exercise equipment has developed for use, for example, in residences, attempts have been made to provide arrangements in which multiple exercise units operate on a single set of weights rather than providing an individual set of weights for each exercise unit. One approach has been an arrangement in which each exercise unit had to be connected to the weight set whenever it was to be used and then disconnected when another of the exercise units was to be used. Another approach has been to connect to the single set of weights by a respective cable for each exercise unit in such a manner that each of these cables is only tensioned when the respective exercise unit is used. This usually results in an arrangement in which the pull line of the cables when tensioned is off center relative to the center of gravity of the weight set.

With the foregoing shortcomings in mind, the present invention aims to provide a simplified arrangement in which multiple exercise units are continuously connected to a single weight set by a pulley and cable system which only attached to the weight set by a single centered cable.

DISCLOSURE OF THE INVENTION

In carrying out the invention, multiple exercise stations are provided, each preferably incorporating more than one exercise unit. Each exercise unit is connected to one of multiple cables each of which is tensioned when one of the exercise units is used. The cable connected to the weight set has an exercise unit at its opposite end and passes over sets of floating pulleys through which are reeved other cables each having exercise units at its ends. Each cable end has a stop to prevent retracting of the cable so that each cable in the system can be tensioned responsive to the use of one of the exercise units. Additional exercise units can be incorporated by use of single floating pulleys on one of the cables which are directly connected to an exercise unit. In some instances, instead of connecting the end of a cable directly to an exercise unit, it can be connected to a pulley which in turn has a secondary cable reeved thereon and connected at its ends to an exercise unit as, for example, a butterfly exercise unit having its wings connected to the ends of the secondary cable.

In the preferred embodiment, three exercise stations are arranged in a generally triangular configuration, with the weight set on a base platform therebetween. Each station has two exercise units. A hollow column houses part of the cable and pulley system and provides a reach arm overlying the weight unit and a second reach arm overlying one of the exercise stations. A first cable connects to the weight set and is guided over the first reach arm into the column where it is reeved through two sets of floating pulleys and then is guided to the outer end of the second reach arm to connect to one of the exercise units. Two other cables were reeved in the column through the respective of the two floating pulley sets and are guided out of the column to the exercise stations. A fourth cable passes over a single floating pulley in the column and connects at its ends to one of the exercise units.

BEST MODE FOR CARRYING OUT THE INVENTION

Figure 1:
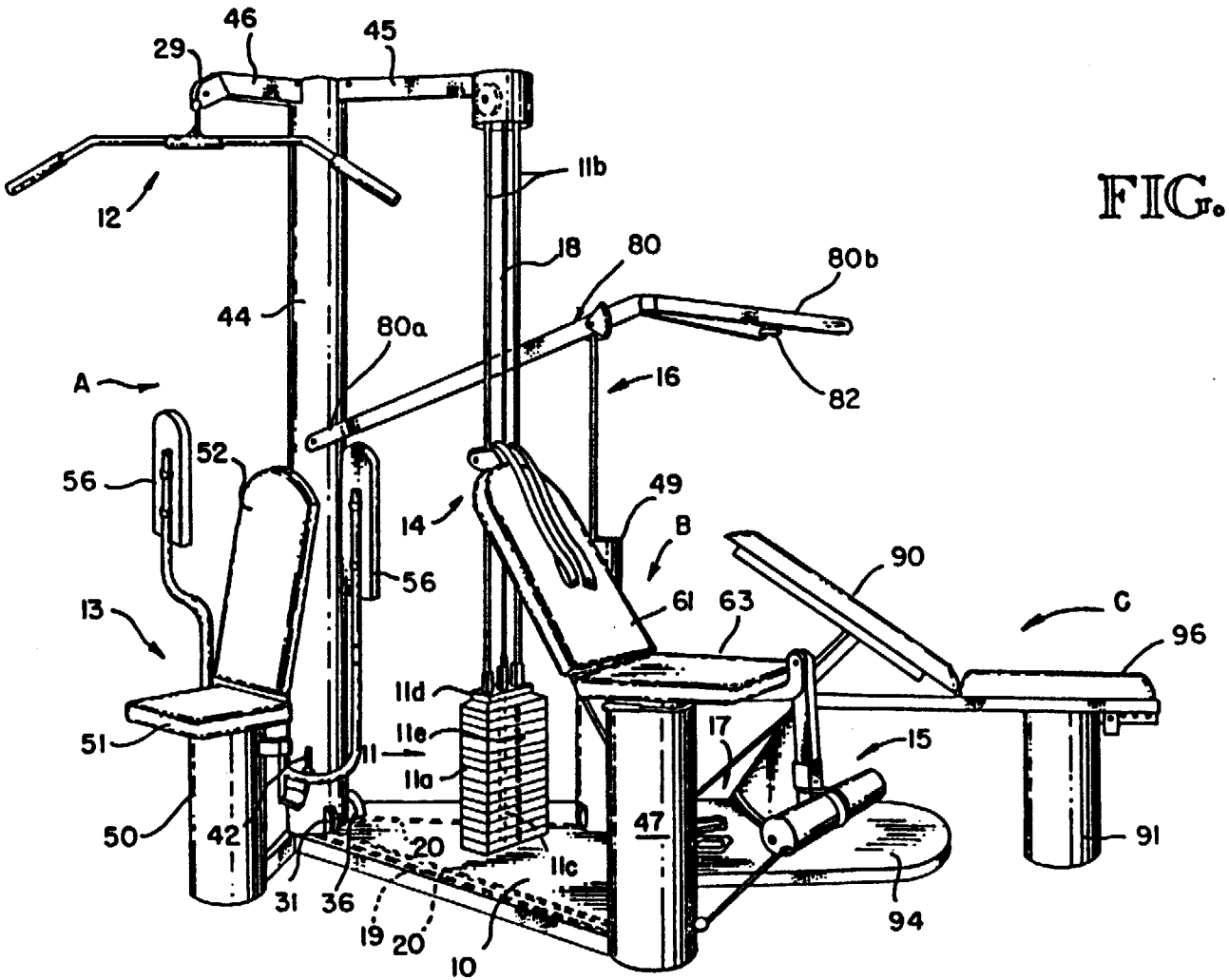
FIG. 1 is a perspective view of an exercise machine embodying the present invention.

Referring to the drawings, the exercise machine of the present invention has three exercise stations A, B and C at the apexes of a generally triangular base frame 10. Each exercise station has two exercise unit individually operative to lift weight in a weight stack unit 11 resting on the base frame. For ease of explanation, the exercise units 12–13 at station A are designated the "high pull unit" and the "butterfly unit," the exercise units 14–15 at station B are designated the "abdominal crunch unit" and the "leg curl/extension unit," and the exercise units 16–17 are designated the "press unit" and the "low pull unit."

The weight stack unit 11 is of standard construction, comprising a stack of rectangular weights 11a which are slide-mounted on a pair of vertical guide rods 11b, each weight having a central horizontal hole registering with a respective hole in a central pick-up rod 11c. This pick-up rod depends from a head plate 11d which is also slide-mounted on the rods 11b and has a lift cable 18 secured thereto. The amount of weight to be lifted is selected by engaging a lock pin 11e through the appropriate one of the weights 11a into the pick-up rod 11c. Hence, when the cable 18 is adequately tensioned, the selected number of weights in the stack is lifted.

Figure 2:
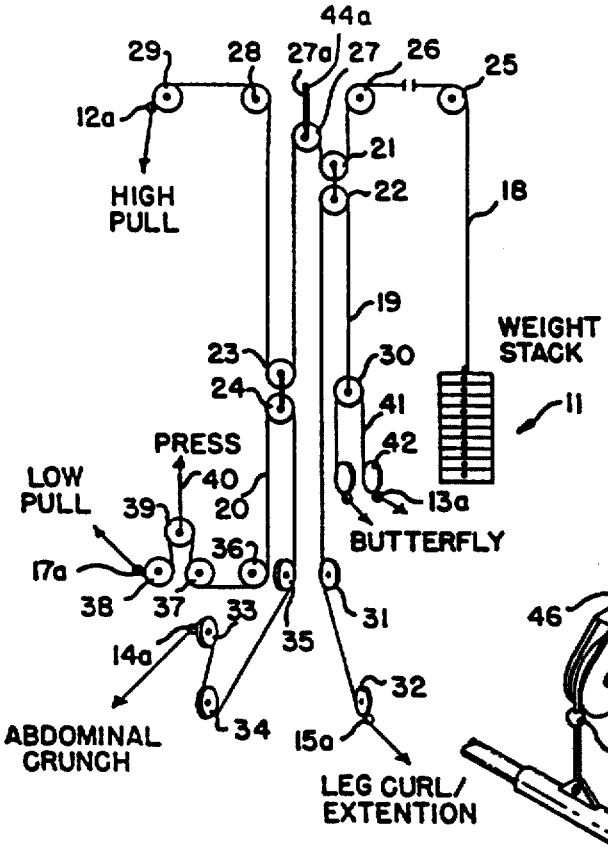
FIG. 2 is a schematic showing the cable and pulley system for the exercise machine.

As shown in FIG. 2, the cable 18 functions in conjunction with cables 19 and 20 by way of floating pulley sets 21–22 and 23–24, the two pulleys in each of these sets being coupled together. Cable 18 is guided by five guide pulleys 25–29 and passes beneath the floating pulley 21. The center pulley 27 is vertically adjustable for slack take-up. Cable 19 passes over the floating pulley 22, is connected to a floating pulley 30, and is guided by guide pulleys 31-32. Cable 20 passes over floating pulley 24, is guided by six guide pulleys 33-38, and passes over a floating pulley 39 which is connected to the lower end of a cable component 40 of the press unit 16. Another cable 41 passes over the floating pulley 30 and is guided by guide pulleys 42-43.

The high pull unit 12 is connected to one end of the cable 18, the butterfly unit 13 is connected to the ends of cable 41, the leg curl extension unit 15 is connected to one end of the cable 19, and the abdominal crunch unit 14 and the low pull unit 17 are connected to the ends of cable 20. The cable component 40 and the cables 18, 19, 20 and 41, have ball-like stop fittings 16a, 12a, 13a, 14a, 15a and 17a, respectively mounted thereon to restrict retraction thereof.

With the described pulley and cable arrangement it can be seen that the tension in the three cables 18-20 is equal whenever one of them is tensioned by operation of an exercise unit, that the tension in the cable 41 is one-half the tension in the cables 18-20, and that the downward pull force on the cable component 40 of the press unit 16 is twice the tension in the cables 18-20.

Adjacent the butterfly unit 13 and at one apex of the base 10 there is mounted a column 44 having two reach arms 45, 46 mounted at its upper end. Reach arm 45 projects above the weight stack 11 and is connected to the upper end of the guide rods 11b. The guide pulleys 25, 26 are mounted at the outer and inner ends of the reach arm 45, and the guide pulleys 28, 29 are mounted at the inner and outer ends of the reach arms 46. Slack adjusting pulley 27 is mounted on the lower end of a threaded rod 27a passing downwardly through a top bracket 44a on the column 44 and having an adjusting nut above the bracket.

The sets 21-22 and 23-24 of floating pulleys and the floating pulley 30 float within the column 44, and the guide pulleys 42-43 for the cable 41 are mounted between two pairs of cheeks projecting from the sides of openings in the column spaced above the lower end thereof and facing the butterfly unit 13. At its lower end, the column 44 has internal supports for the guide pulleys 31, 35. These pulleys are in staggered relationship and guide the cables 19, 20 through openings in the column 44 toward station B. The column 44 has a third pair of cheeks projecting near the lower end thereof from the sides of an opening to receive the guide pulley 36, which is arranged to guide the cable 20 toward station C.

At station B, a cylindrical pedestal 47 is mounted on the base frame 10 and has the pulleys 32 and 34 mounted in its lower end with adjacent openings for the cables 19, 20. Another pedestal 49 is mounted on the base frame 10 for housing the floating pulley 39 below the press unit 16. The guide pulleys 37, 38 are mounted at the lower end of the pedestal 49 at openings for entry of the cable 20 and exit thereof to make connection to the low pull unit 17 after passing over the floating pulley 39, which floats within the pedestal 49 and is connected to the cable component 40 of the press unit 16.

Figure 3:
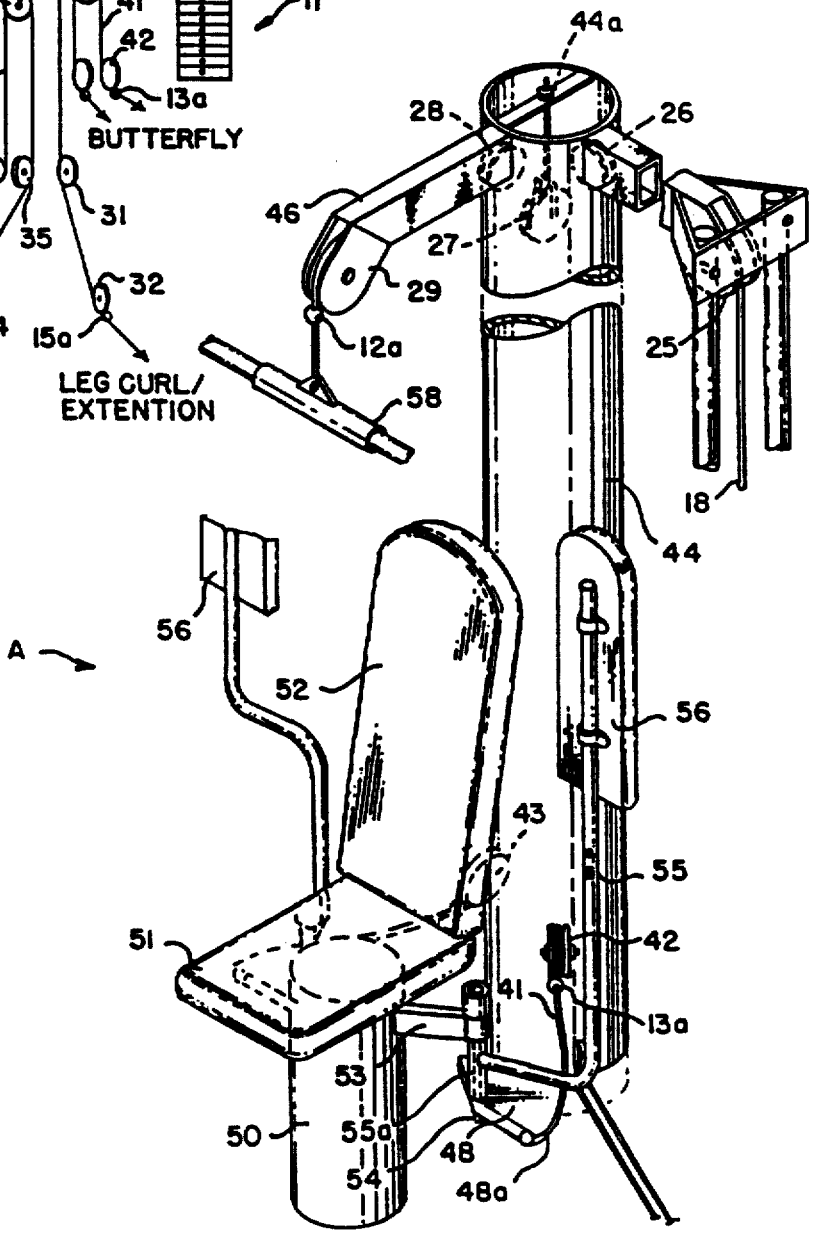
FIG. 3 is a perspective view of one of the exercise station which incorporates a high pull exercise unit and a butterfly exercise unit.

Directing attention to the butterfly unit 13 (FIG. 3), the ends of the cable 41 pass out of the column 44 beneath the guide pulleys 42-43 and are anchored at the front of a pair of generally horizontal cam members 48 which are located at opposite sides of a pedestal 50 for a seat 51 having an upstanding back rest 52. The pedestal 50 and back rest 52 are rigidly connected to the columnn 44 by suitable rear braces. A pair of brackets 53 project laterally from opposite sides of the pedestal 50, and each supports a depending pivot pin 54 on which a sleeve 55a is journal-mounted which is connected to a swinging support rod 55 of generally Z-shape for a respective padded wing 56. At its lower end, each sleeve 55a is secured to a respective one of the cams 48. The pivot pins 54 extend downwardly beyond the sleeves 55a to receive cotter keys therethrough for retaining the wings 56 and related apparatus. The stops 13a are fixed on the cable 41 so that they will engage the column 44 at the exit openings for the cable 41 from the column 44 at the pulleys 42-43 and leave slack in the portions of the cable 41 between the stops 13a and the cams 48 when the wings 56 are swung rearwardly toward the column 44 sufficiently to be out of the way of an exerciser seated on the seat 51 and pulling down on the overhead handlebar 58 of the exercise unit 12, in opposition to the selected number of weights in the weight stack 11.

When an exerciser desires to perform the butterfly exercise after seating on the seat 5, the exerciser swings the wings 56 forwardly taking out the slack in the outer end portions of the cable 41, and then swings the wings 56 forwardly by pressure of the forearms applied at the back of the wings. This forward swinging motion tensions the cable 41 over the outer surface of curved convex cams 48a at the back of the cam members 48 as they rotate with the wings 56 about the axis of the pivot pins 54 in opposition to the selected number of weights in the weight stack 11. I is noteworthy that the described arrangement makes it possible for the seat 51 to be used for both the butterfly unit 13 and high pull unit 12 without the movable components of either unit being in the way of the exerciser when not in use.

Figure 6:
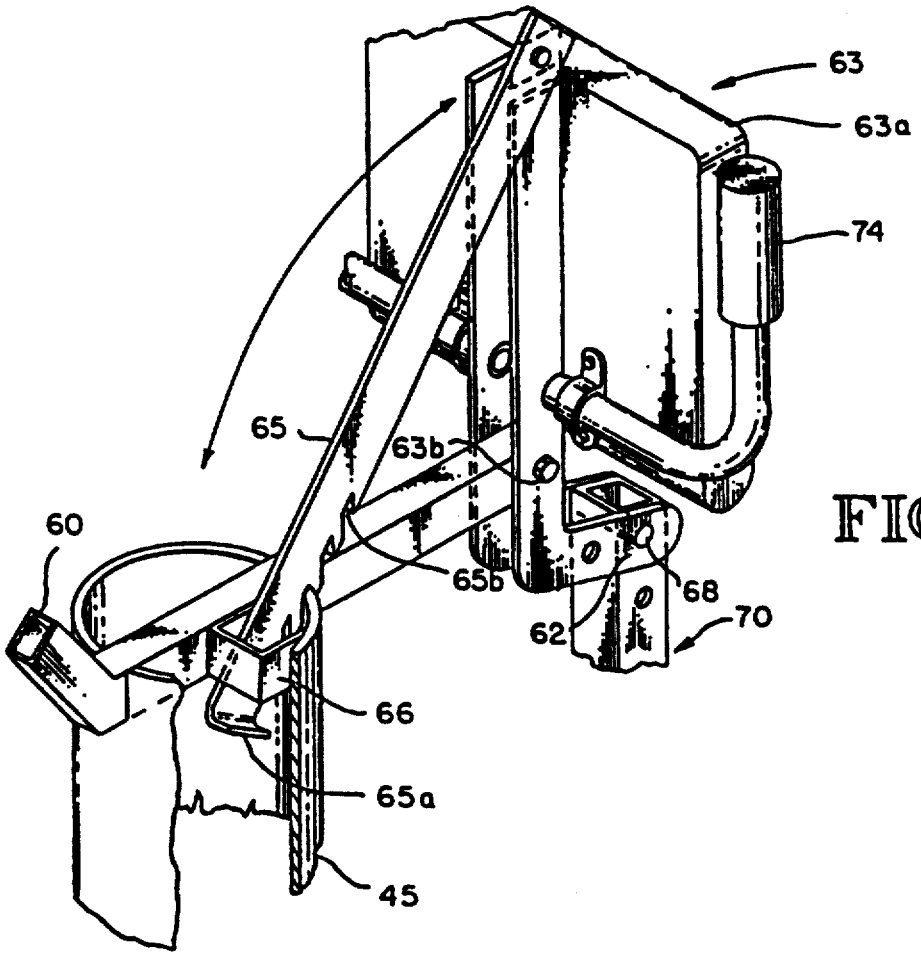
FIG. 6 is a fragmentary perspective view of the second exercise station showing the seat raised to the position for performing the leg curl/extension exercise.

Continuing to station B (FIGS. 4 and 6), the pedestal 47 rigidly supports a rearwardly sloped back support member 60 to which is connected a padded back rest 61. The member 60 continues horizontally at its lower end over the top of the pedestal 47 and is straddled by the frame 62 of a seat assembly 63. The frame 62 extends upwardly forwardly of the seat to provide a pivot support 62a. The seat assembly has a padded seat 63a and is pivoted at 63b so that it can swing upwardly to a generally vertical position, as shown in FIG. 6, preparatory to performance of the leg curl exercise. The back support member 60 supports the pulley 33 at the top on a pulley bracket which is engaged by the stop ball 14a on the respective end of the cable 20 when the exercise unit 14 is idle. A pair of elongated strap loops 64 are connected to the end of the cable 20 to function as part of the apparatus for the abdominal crunch exercise.

Pivoted at an upper end to the back of the seat 63 is a link 65 which has its lower end bent at right angles to the rest of the link to provide a stop 65a for cooperating with the underside of a U-shaped bracket 66 mounted on the inside of the seat pedestal 47. The link 60 extends through the bracket 66 and is formed with a notch 65b to serve as a catch for fitting onto the upper end of the seat pedestal 47 when the seat assembly 63 is swung upwardly so that the seat assembly 63 cannot then swing down from the upright position without the link 65 being lifted free of the seat pedestal 47 preparatory to swinging the seat back to a horizontal seating position.

A dual-purpose element 70 of inverted T-shape having padded bottom arms 70a is pivotally suspended at 68 from the pivot support 62a. The cable 19 passes from the guide pulley 32 in the seat pedestal 45 forwardly through a front opening in the pedestal and connects to the lower end of the dual-purpose element 70. The stop ball 15a is fixed on the cable 19 to engage the outer face of the pedestal when the dual-purpose element 70 is in a down position and a releasable lock pin 72 passes through the pivot support 62 and upper end of the dual-purpose element 70 so that the latter can be selectively held in a fixed down position or be free to be swung forwardly away from the seat pedestal 47. It will be noted that the seat assembly 63 also has a pair of side handles 74 which are laterally offset from the seat 63a and are positioned so that they may be conveniently grasped by a rearwardly facing exerciser when the seat occupies its horizontal or upright position.

Figures 4, 5:
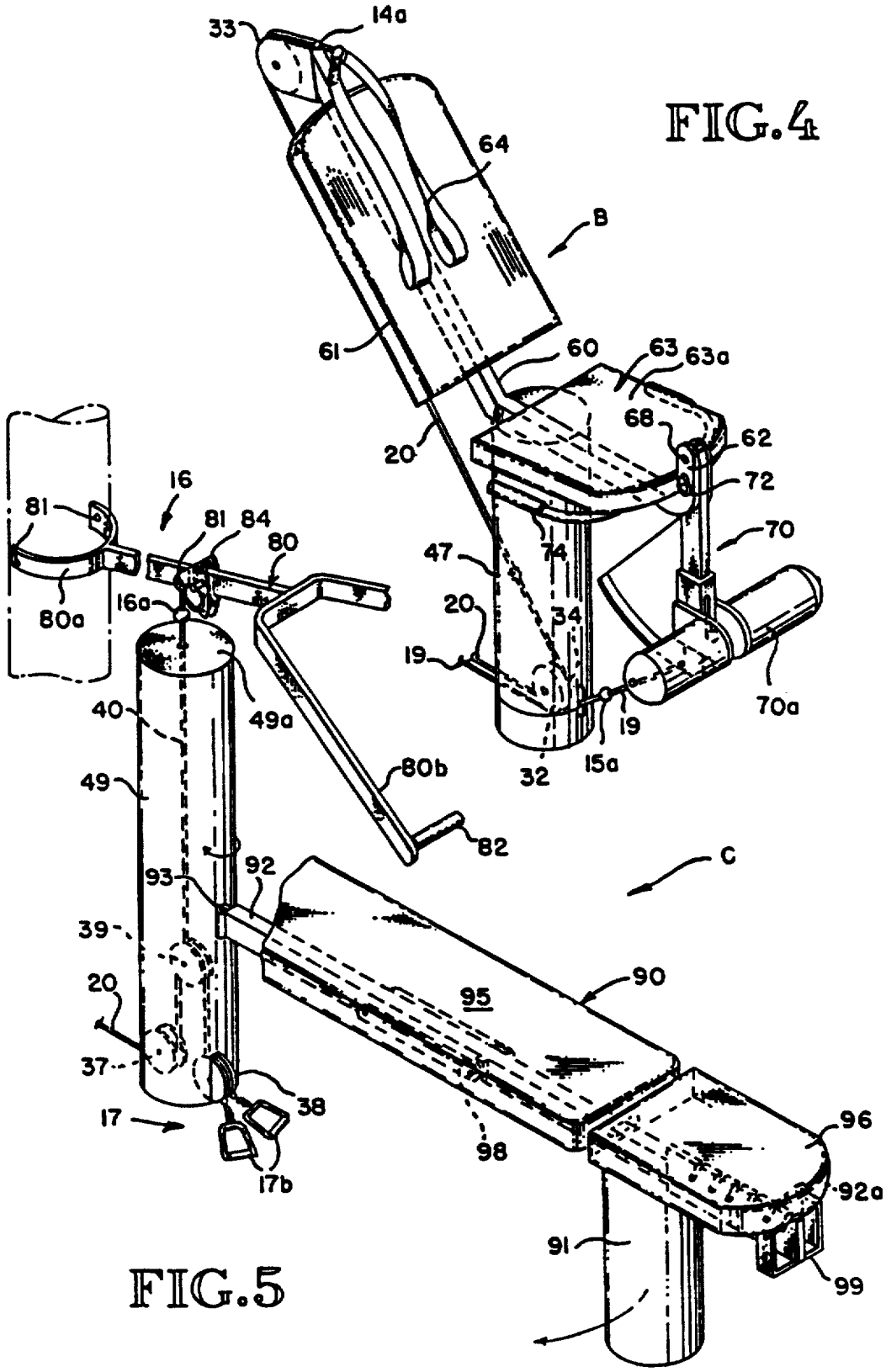
FIG. 4 is a perspective view of the second exercise station which incorporates an abdominal crunch exercise unit and a leg curl/extension exercise unit, the station having its seat in the lowered position for performing the abdominal crunch exercise.
FIG. 5 is a perspective view of the third exercise station which incorporates the press exercise unit and low pull exercise unit.

The abdominal crunch exercise is performed when the seat assembly 63 is in its horizontal position, as shown in FIG. 4, and the dual-purpose element 70 is locked against swinging movement by the pin 72. The exeriser seats on the seat 63a, rests his back against the back rest 61 with the loops 64 passing over his shoulders, and positions his legs so the front of his ankles bear against the back of the padded bottom arms 70a. Then the exerciser performs the abdominal crunch exercise by grasping the loops 64 and pulling them downwardly and outwardly away from the upper pulley 33 in opposition to the selected load at the weight stack while keeping his lower back against the back rest 61.

To perform the leg extension exercise, the exerciser unlocks the dual-purpose element 70 by removing the pin 72 and then grasps the handles 74 while seated. Using both legs, the exerciser pivots his legs at the knee away from the seat pedestal 47, engaging the padded arms 70a and forcing element 70 to swing forwardly in opposition to the selected load at the weight stack 11.

Preparatory to performing the leg curl exercise, the seat assembly 63 is swung upwardly and locked in upright position by use of the link 65, and the lock pin 72 is released so that the dual-purpose element 70 is free to swing forwardly in opposition to the selected load at the weight stack 11. As the seat assembly 63 swings upwardly, the pivot 68 swings forwardly and lowers. In the raised position of the pivot 68, the arms 70a of the dual-purpose element 70 are at the most suitable height for the leg extension exercise; and when the pivot 68 is in its lowered position, the pivot 68 and arms 70 are in the most suitable position for the standing leg curl exercise. The exerciser faces rearwardly in standing position with his legs behind the padded bottom arms 70a and grasps the upright seat handles 74. Then the exerciser pivots one of his legs at the knee away from the seat pedestal 47 so that the back of the ankle of the leg engages the respective padded arm 70a and forces the dual-purpose element 70 to swing forwardly away from the seat pedestal 47 in opposition to the selected load at the weight stack 11. After swinging the leg back and forth the selected number of times, the exercise is repeated with the other leg.

Continuing to station C, the cable 20 passes forwardly from the guide pulley 38 (FIG. 5), through a front opening in the pedestal 49 and is connected, for example, to a pair of hand grips 17b for performing a low pull exercise. The pulley 38 is preferably mounted for swinging movement of about thirty degrees on a vertical axis. The stop 17a on the cable 20 is arranged to engage a stop bracket at the underside of the pulley 38 to restrict retraction of the cable.

As previously indicated, the cable component 40 is connected to the floating pulley 39 within the pedestal 49. It extends upwardly through a center opening in a head plate 49a at the top of the pedestal 49 and has the stop 16a arranged to engage the upper surface of the head plate 49a when the press unit 16 is not in use. The cable component 40 is connected at its upper end to a swing bar 80 having a forked rear end portion 80a which straddles the column 44 and is pivotally connected thereto at 81. The forward end of the swing bar 80 has rigid fork extensions 80b which are bridged at their forward ends by a handle bar 82. It is preferred that the cable component 40 be connected to the swing bar 80 approximately midway between the pivot 81 and the handlebar 82 so that the exerciser has a 2:1 mechanical advantage when he pushes up on the handle bar 82 in opposition to the load of the selected weights in the weight stack 11 in performing the press exercise. This 2:1 mechanical advantage, by doubling the upward force exerted on the pulley 39 for a given manual upward force exerted on the handle bar 82, results in substantially the same tension in the cables 18-20 as results when the same manual force is applied to the cables 18-20 at any one of the other exercise units. The function of stop 16a can be performed by having the handle 80 rest directly on the pedestal 49.

To provide adjustment of the height of the handle bar 82 during performance of the press exercise, the swing bar 80 is articulated forwardly of the cable component 40 to provide rear and forward swing bar sections 80a, 80b. The rear section 80a has a sector plate 84 forwardly of the articulation. This plate has an arcuate row of holes for selectively receiving a pin registering with a hold through the front section 80b.

For body support while performing the press exercise, a bench assembly 90 is provided at station C which comprises a pedestal 91 supporting the forward end portion of a bench frame 92. At its rear end the bench frame 92 is pivotally mounited at 93 to the pedestal 49 for horizontal swinging movement so that the bench assembly can be swung laterally out of the way when optional exercises are to be performed using exercise unt 16 or a low pull exercise is to be performed using grips 17b. In this regard, a resilient floor mat 94 connected to pedestal 49 may be provided for stability when performing low pull exercised with exercise unit 17 or press exercises with exercise unit 16 without use of the bench 90.

The bench assembly has padded adjustable back rest and seat rest sections 95-96 swingably connected together. The back rest section 95 has a pair of pivoted links 98 pivotally connected to the frame 92 and the seat section 96 is slidable along the frame 92 for adjusting the slope of the back rest section. Notches 92a in the frame 92 are selectively engaged by a slide element 99 on the seat section 96 to hold it in the horizontal position corresponding to the desired slope, if any, for the back section 95.

It will be apparent that additional exercise stations can be added incorporating the cable and pulley system concepts of the invention. It is also apparent that sprockets and chains can be substituted for the pulleys and cables of the system; hence, it is intended that "pulley" and "cable" when used in the claims be interpreted to include sprockets and chains or belts.

From the foregoing it will be appreciated that, although specific embodiments of the invention have been described herein for purposes of illustration, various modifications may be made without deviating from the spirit and scope of the invention. Accordingly, the invention is not limited except as by the appended

*Claims 1, 2, 3, 4, 13, 20, 21 and 24 of U.S. Pat. No. 4,809,972, reissued as this reissue patent, were canceled by a Statutory Disclaimer filed Feb. 20, 1990.*

We claim:

5. An exercise machine comprising:

a load;

first, second and third exercise units;

a first set of floating pulleys coupled together;

a second set of floating pulleys coupled together;

a first cable passing over one of said floating pulleys of said first set and one of said floating pulleys of said second set, and connected at one of its ends to said load and connected at its other end to said first exercise unit;

a second cable passing over the other of said floating pulleys of said first set and connected at one of its ends to said second exercise unit and connected at its other end to a stop;

a third cable passing over the other of said floating pulleys of said second set and connected at one of its ends to said third exercise unit and connected at its other end to a stop; and stops for said exercise units whereby a manual exercising force applied either to said first cable by use of said first exercise unit, or to said second cable by use of said second exercise unit, or to said third cable by use of said third exercise unit, applies a like force to said load and to all of said stops except the stop for the exercise unit in use.

6. An exercise machine comprising:

a load;

first, second, third, fourth and fifth exercise units;

a first set of floating pulleys coupled together;

a second set of floating pulleys coupled together;

a first cable passing over one of said floating pulleys of said first set and one of said floating pulleys of said second set, and connected at its other end to said first exercise unit;

a second cable passing over the other of said floating pulleys of said first set and connected at its ends to said second and third exercise units;

a third cable passing over the other of said floating pulleys of said second set and connected at its ends to said fourth and fifth exercise units; and stops for said exercise units whereby a manual exercising force applied either to said first cable by use of said first exercise unit, or to said second cable by use of said second or third exercise units, or to said third cable by use of said fourth or fifth exercise units, applies a like force to said load and to all of said stops except the stop for the exercise unit in use.

7. An exercise machine comprising:

a base support;

a column mounted on said base support and having first and second reach arms projecting therefrom;

first, second and third exercise units arranged with said first exercise unit at a higher elevation than said second and third exercise units located adjacent the outer end of said second reach arm;

a weight carried by said base support and positioned beneath the outer end of said first reach arm;

a first cable connected at one of its ends to said weight and connected at its other end to said first exercise unit;

first and second floating pulleys coupled together, said first floating pulley having said first cable passing thereunder below the level of said reach arms and adjacent said column;

guide means on said reach arms for guiding said first cable from said weight to the outer end of said first reach arm, along said first reach arm and down to said first floating pulley, up to said second reach arm from said first floating pulley, and along said second reach arm to said first exercise unit;

a second cable connected at one of its ends to said second exercise unit and connected at its other end to said third exercise unit;

said second cable passing over said second floating pulley;

guide means for guiding said second cable from said second floating pulley to the base of said column and from there to said second and third exercise units;

each of said exercise units having a respective stop whereby a manual exercising force applied either to said first cable by use of said first exercise unit, or to said second cable by use of said second or third exercise unit applies a lifting force to said weight and a force of the same magnitude to all of said stops except the stop for the exercise unit in use.

8. An exercise machine comprising:

a base support;

a column mounted on said base support and having first and second reach arms projecting therefrom;

first, second, third, fourth and fifth exercise units arranged with said first exercise unit at a higher elevation than said second and third exercise units and located adjacent the outer end of said second reach arm;

a weight carried by said base support and positioned beneath the outer end of said first reach arm;

a first cable connected at one of its ends to said weight and connected at its other end to said first exercise unit;

first and second floating pulleys coupled together, said first floating pulley having said first cable passing thereunder below the level of said reach arms and adjacent said column;

first guide means on said reach arms for guiding said first cable from said weight to the outer end of said first reach arm, along said first reach arm and down to said first floating pulley, up to said second reach arm from said first floating pulley and along said second reach arm to said first exercise unit;

a second cable connected at one of its ends to said second exercise unit and connected at its other end to said third exercise unit, said second cable passing over said second floating pulley;

second guide means for guiding said second cable from said floating pulley to the base of said column and from there to said second and third exercise units;

third and fourth floating pulleys coupled together at a level lower than that of the first and second floating pulleys, said first cable also passing under said third floating pulley;

a third cable passing over said fourth floating pulley, said third cable being connected at one of its ends to said fourth exercise unit and connected at its other end to said fifth exercise unit;

third guide means for guiding said third cable from said fourth floating pulley to the base of said column and from there to said fourth and fifth exercise units;

each of said exercise units having a respective stop whereby a manual exercising force applied either to said first cable by use of said exercise unit, or to said second cable by use of said second or third exercise unit, or to said third cable by use of said fourth or fifth exercise unit, applies a lifting force to said weight and a force of the same magnitude to all of said stops except the stop for the exercise unit in use.

9. An exercise machine according to claim 8 in which a pedestal is mounted on said base support and carries said third and fourth exercise units, and part of said second and third guide means is carried by said pedestal.

[10. An exercise machine comprising:

a load;

first, second and third exercise units;

two floating pulleys coupled together;

an adjustable idler pulley;

a first cable passing over one of said floating pulleys and said adjustable idler pulley, and connected at one of its ends to said load and connected at its other end to said first exercise unit;

a second cable passing over the other of said floating pulleys and connected at one of its ends to said second exercise unit and connected at its other end to said third exercise unit;

stops for said exercise units whereby a manual exercising force applied either to said first cable by use of said first exercise unit, or to said second cable by use of said second or third exercise unit applies a like force to said load and to all of said stops except the stop for the exercise unit in use.]

11. An exercise machine comprising:

a load;

first, second, third, fourth and fifth exercise unit;

a first set of floating pulleys coupled together;

a single floating pulley;

a second set of floating pulleys coupled together;

a first cable passing over one of said floating pulleys of said first set and one of said floating pulleys of said second set, and connected at one of its ends to said load and connected at its other end to said first exercise unit;

a second cable passing over the other of said floating pulleys of said first set and connected at one of its ends to said second exercise unit and connected at its other end to said single floating pulley;

a third cable passing over the other of said floating pulleys of said second set, and connected at one of its ends to said third exercise unit and connected at its other end to said fourth exercise unit;

a fourth cable passing over said single floating pulley and connected at its ends to said fifth exercise unit;

stops for said exercise units whereby a manual exercising force applied either to said first cable by use of said first exercise unit, or to said second cable by use of said second exercise unit, or to said fourth cable by use of said fifth exercise unit, applies a force to said load and to all of said stops except the stop for the exercise unit in use.

12. An exercise machine comprising:

a load;

first, second, third, fourth, fifth and sixth exercise units, a first set of floating pulleys coupled together;

a second set of floating pulleys coupled together;

first and second single floating pulleys;

a first cable passing over one of said floating pulleys of said first set and one of said floating pulleys of said second set and connected at one of its ends to said load, and connected at its other end to said first exercise unit;

a second cable passing over the other of said floating pulleys of said first set and connected at its ends to said second exercise unit and to said first single floating pulley;

a third cable passing over the other of said floating pulleys of said second set and said second single floating pulley, and connected at its ends to said fourth and fifth exercise units;

a fourth cable passing over said first single floating pulley and connected at its ends to said third exercise unit;

said sixth exercise unit being connected to said second single floating pulley;

stops for said exercise units whereby a manual exercising force applied either to said first cable by use of said first exercise unit, or to said second cable by use of said second exercise unit, or to said third cable by use of said fourth, fifth or sixth exercise units, or to said fourth cable by use of said third exercise unit, applies a force to said load and to all of said stops except the stop for the exercise unit in use.

14. An exercise machine comprising:

a weight;

first, second, third and fourth exercise units;

two floating pulleys coupled together as a set;

a single floating pulley;

a first cable passing over one of said floating pulleys of said set and connected at one of its ends to said weight and connected at its other end to said first exercise unit;

a second cable passing over the other of said floating pulleys of said set and over said single floating pulley, and connected at one of its ends to said second exercise unit and connected at its other end to said third exercise unit;

said fourth exercise unit having a pull element connected to said single floating pulley and having a swing arm which is pivoted at a first of its ends, has a handle at its other end, and is centrally pivotally connected to said pull element whereby manual force applied to said handle will be multiplied at said single floating pulley.

15. An exercise machine according to claim 14 in which said arm is pivotally connected at its said first end to a hollow column in which said set of floating pulleys is housed.

16. An exercise machine according to claim 15 in which said column has a first reach arm extending over said weight and has a second reach arm from which said first exercise unit is suspended by said first cable, and in which said first cable extends from said first reach arm to said weight;

said second cable passing out of said column to said column below the level of said set of floating pulleys to pass over said single floating pulley and to connect to said second and third exercise units.

17. An exercise machine according to claim 14 in which said swing arm extends over a hollow pedestal in which said single floating pulley is housed, said hollow pedestal having a transverse element connected thereto with an opening through which said pull element passes; and said pull element having a stop above said opening for engaging the transverse element to restrict downward movement of said single floating pulley when said fourth exercise unit is idle.

18. An exercise machine according to claim 17 in which said pedestal has entry and exit guide pulleys below the level of said single floating pulley, said second cable passing over said guide pulleys and said third exercise unit being located adjacent said exit guide pulley.

19. An exercise machine according to claim 17 in which a bench is swing mounted about a vertical axis at one of its ends on said pedestal below said handle.

22. An exercise machine comprising:

a load;

first, second, and third exercise units;

two floating pulleys coupled together;

a single pulley;

a first cable passing over one of said floating pulleys and connected at one of its ends to said load and connected at its other end to said first exercise unit;

a second cable passing over the other of said floating pulleys and connected at one of its ends to said second exercise unit and connected at its other end to said single pulley;

a third cable passing over said single pulley and connected to said third exercise unit; and respective stop means for said exercise units whereby a manual exercising force applied to said first cable by use of said first exercise unit, or to said second cable by use of said second exercise unit, or to said third cable by use of said third exercise unit, applies a force to said load and to all of said stop means except the stop means for the exercise unit in use.

23. An exercise machine according to claim 22 in which said third exercise unit is a butterfly exercise unit including a pair of swing arms operatively associated with the ends of said third cable.

25. An exercise machine comprising:

a load;

first, second, third and fourth exercise units;

two floating pulleys coupled together;

a third floating pulley;

a first cable passing over one of said two floating pulleys and connected at one of its ends to said load and connected at its other end to said first exercise unit;

a second cable passing over said third floating pulley and the other of said two floating pulleys, and connected at one of its ends to said second exercise unit and connected at its other end to said third exercise unit;

said fourth exercise unit being operatively associated with said third floating pulley;

stops for said exercise units whereby a manual exercising force applied either to said first cable by use of said first exercise unit, or to said second cable by use of said second or third exercise units, or to said third floating pulley by use of said fourth exercise unit, applies a force to said load and to all of said stops except the stop for the exercise unit in use.

26. An exercise machine comprising:

a movable load;

first, second, and third exercise units;

a first floating pulley unit;

a second floating pulley unit;

a first cable receiving said floating pulley units and said load and connected to said first exercise unit such that a force exerted on either one of said floating pulley units or on said first exercise unit responsively tensions said first cable and is resisted by said load;

a second cable carried by said first floating pulley unit and connected at one of its ends to said second exercise unit;

a third cable carried by said second floating pulley unit and connected at one of its ends to said third exercise unit; and stops on said three cables whereby a manual exercising force applied either to said first cable by use of said first exercise unit, or to said second cable by use of said second exercise unit, or to said third cable by use of said third exercise unit, responsively tensions said first cable and applies a force tending to move said load.

27. An exercise machine comprising:

a weight unit;

first, second, and third exercise units;

first and second floating pulley units;

a first cable operatively receiving said floating pulley units and loaded by said weight unit;

first and second nonfloating pulley units receiving said first cable and located, respectively, between said weight unit and one of said pulley units and between said weight unit and said first exercise unit;

a second cable carried by said first pulley unit and connected to said second exercise unit;

a third cable carried by said second pulley unit and connected to said third exercise unit; and stops for said three cables arranged such that a manual exercising force applied to any of said three exercise units responsively tensions each of said three cables and is resisted by said weight unit.

*28. An exercise machine comprising*

*a vertically movable weight;*

*first, second, third and fourth exercise units;*

*a set of upper and lower floating pulleys coupled together for unitary vertical movement;*

*a bodily moveable pulley associated with said fourth exercise unit such that a manual exercising force applied to said fourth exercise unit causes displacement of said bodily moveable pulley;*

*two upper guide pulleys at a higher elevation than said set of floating pulleys;* two lower guide pulleys at a lower elevation than said set of floating pulleys;

*an additional guide pulley;*

*a frame assembly supporting all of said guide pulleys;*

*a first cable passing part way around said additional guide pulley, over the top of said upper guide pulleys and looping downwardly between the latter by a loop passing beneath the underside of the upper one of said floating pulleys, said first cable being connected at one of its ends so as to be loaded by said weight and connected at its other end to said first exercise unit, said first cable also looping part way around said bodily moveable pulley at a location between said upper guide pulleys and said additional guide pulley;*

*a second cable passing beneath the underside of said lower guide pulleys and looping upwardly therebetween by a loop passing over the top of the lower one of said floating pulleys, and said second cable being connected at one of its ends to said second exercise*

*unit and connected at its other end to said third exercise unit; and*

*stops for said exercise units whereby a manual exercising force applied either to said first cable by use of said first and fourth exercise units or applied to said second cable by use of said second or third exercise unit, applies a lifting force to said weight and a force to all of said stops except the stop for the exercise unit in use, whereby said set of floating pulleys remains vertically stationary and said weight lifts when said first or fourth exercise unit is used, and whereby said set of floating pulleys lowers and said weight lifts responsive to use of said second or third exercise unit.*

*29. An exercise machine according to claim 28 in which said additional guide pulley is located between said upper guide pulleys and said first exercise unit.*

*30. An exercise machine according to claim 29 in which said additional guide pulley is located between said upper guide pulleys and said weight.*

* * * * *